United States Patent
Liu et al.

(10) Patent No.: US 11,570,289 B2
(45) Date of Patent: Jan. 31, 2023

(54) PRESSURE-SENSITIVE VIBRATION PROCESSING METHOD AND APPARATUS, MOBILE TERMINAL AND ELECTRONIC DEVICE

(71) Applicant: BEIJING XIAOMI MOBILE SOFTWARE CO., LTD., Beijing (CN)

(72) Inventors: Yinghong Liu, Beijing (CN); Guilin Zhong, Beijing (CN); Ju Tang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 237 days.

(21) Appl. No.: 16/918,462

(22) Filed: Jul. 1, 2020

(65) Prior Publication Data

US 2021/0250433 A1 Aug. 12, 2021

(30) Foreign Application Priority Data

Feb. 10, 2020 (CN) .......................... 202010085232.7

(51) Int. Cl.
*H04M 1/02* (2006.01)
*G06F 3/041* (2006.01)
*G06F 3/01* (2006.01)

(52) U.S. Cl.
CPC .......... *H04M 1/0266* (2013.01); *G06F 3/016* (2013.01); *G06F 3/0412* (2013.01);
(Continued)

(58) Field of Classification Search
CPC ............. H04M 1/0249; H04M 1/0266; H04M 2250/22; G06F 3/0412; G06F 3/016; G06F 2203/04105
See application file for complete search history.

(56) References Cited

U.S. PATENT DOCUMENTS

2013/0181931 A1* 7/2013 Kinoshita ........... G06F 3/04883
345/173
2015/0348495 A1* 12/2015 Kim ........................ G09G 3/20
345/522
(Continued)

FOREIGN PATENT DOCUMENTS

| CN | 107563166 A | 1/2018 |
| CN | 108683802 A | 10/2018 |
| CN | 108874138 A | 11/2018 |

OTHER PUBLICATIONS

Extended European Search Report in Application No. 20187905.3, dated Jan. 15, 2021.

*Primary Examiner* — Afroza Chowdhury
(74) *Attorney, Agent, or Firm* — Syncoda LLC; Feng Ma

(57) ABSTRACT

A pressure-sensitive vibration processing method can be applied to a mobile terminal including an application processor, a pressure sensor, and a vibration motor. The method can include: in a first state of the mobile terminal, notifying directly, with the pressure sensor, the vibration motor to generate vibration, when pressure received by the pressure sensor exceeds a threshold, the first state including a state where the application processor is in sleep; and in a second state of the mobile terminal, notifying, with the pressure sensor, the application processor to control the vibration motor to generate vibration, when pressure received by the pressure sensor exceeds the threshold, the second state including a state where the application processor is awake. A timely response is therefore ensured when vibration is needed, and it can also be ensured that various vibrations are handled normally during system operation to avoid abnormal vibration feedback.

17 Claims, 5 Drawing Sheets

(52) U.S. Cl.
CPC . *H04M 1/0249* (2013.01); *G06F 2203/04105* (2013.01); *H04M 2250/22* (2013.01)

(56) References Cited

U.S. PATENT DOCUMENTS

2016/0378319 A1* 12/2016 Cho .................... G06F 3/04847
                                                          715/773
2019/0011974 A1*  1/2019 Jeon ................... G06F 3/03547

* cited by examiner

PRESSURE-SENSITIVE VIBRATION PROCESSING METHOD AND APPARATUS, MOBILE TERMINAL AND ELECTRONIC DEVICE

CROSS-REFERENCE TO RELATED APPLICATION

This application claims priority to Chinese Patent Application 202010085232.7 filed on Feb. 10, 2020, the disclosure of which is hereby incorporated by reference in its entirety.

BACKGROUND

At present, pressure-sensitive buttons are applied more and more to various scenarios in mobile terminal devices such as mobile phones and tablet computers. The rapid response of pressure-sensitive vibration plays a crucial role in improving the user experience. The quick start, quick stop, and the short and sensitive response of the vibration motor can make users feel an effect of similar physical key pressing.

SUMMARY

The present disclosure generally relates to the field of mobile terminal control, and specifically to a pressure-sensitive vibration processing method, a pressure-sensitive vibration processing apparatus, a mobile terminal, an electronic device, and a computer-readable storage medium.

According to a first aspect of embodiments of the present disclosure, there is provided a pressure-sensitive vibration processing method applied to a mobile terminal including an application processor, a pressure sensor for monitoring pressure, and a vibration motor for generating vibration. The pressure-sensitive vibration processing method includes: in a case that the mobile terminal is in a first state, notifying directly, by the pressure sensor, the vibration motor to generate vibration, when pressure received by the pressure sensor exceeds a threshold, wherein the first state includes a state where the application processor is in sleep; and in a case that the mobile terminal is in a second state, notifying, by the pressure sensor, the application processor to control the vibration motor to generate vibration, when pressure received by the pressure sensor exceeds the threshold, wherein the second state includes a state where the application processor is awake.

In some embodiments, a first pin of a pressure-sensitive chip of the pressure sensor is connected directly to a second pin of a motor chip of the vibration motor; and the notifying directly, by the pressure sensor, the vibration motor to generate vibration is implemented by: pulling down or up by the pressure-sensitive chip, a level of the first pin; and enabling the vibration motor to generate vibration in a case that the motor chip receives the level pulled down or up through the second pin directly connected to the first pin.

In some embodiments, a third pin of a pressure-sensitive chip of the pressure sensor is connected directly to a fourth pin of the application processor, and the vibration motor includes a motor chip. The application processor is notified through the pressure sensor, so that the application processor controls the vibration motor to generate vibration, which is achieved in the following manner. The pressure-sensitive chip pulls the level of the third pin low or high. The application processor receives the level low or high through the fourth pin directly connected to the third pin, and then uploads the vibration signal to the frame layer. After receiving the vibration signal, the frame layer will send a vibration command to the motor chip; after receiving the vibration command, the motor chip will cause the vibration motor to generate corresponding vibration based on the vibration command.

In some embodiments, the pressure-sensitive vibration processing method further includes: determining whether a current state of the mobile terminal is the first state or the second state through the application processor: sending first notification to the pressure sensor when the mobile terminal is in the first state, to enable the pressure sensor to notify directly the vibration motor to generate vibration when the pressure received by the pressure sensor exceeds the threshold; and sending second notification to the pressure sensor when the mobile terminal is in the second state, to enable the pressure sensor to notify the application processor to control the vibration motor to generate vibration when the pressure received by the pressure sensor exceeds the threshold.

In some embodiments, the first state includes one of the following states: the mobile terminal being in a screen off state, the mobile terminal being in a power saving mode, and the mobile terminal being in a sleep mode; and the second state includes one of the following states: the mobile terminal being in a screen on state, and the mobile terminal receiving a voice and/or key command.

According to a second aspect of embodiments of the present disclosure, there is provided a pressure-sensitive vibration processing apparatus applied to a mobile terminal including an application processor, a pressure sensor for monitoring pressure, and a vibration motor for generating vibration, and the pressure-sensitive vibration processing apparatus includes: a first processing unit configured to notify directly the vibration motor to generate vibration through the pressure sensor when the mobile terminal is in a first state and the pressure received by the pressure sensor exceeds a threshold, wherein the first state includes a state where the application processor is in sleep; and a second processing unit configured to notify the application processor to control the vibration motor to generate vibration through the pressure sensor when the mobile terminal is in a second state and the pressure received by the pressure sensor exceeds the threshold, wherein the second state includes a state where the application processor is awake.

In some embodiments, a first pin of a pressure-sensitive chip of the pressure sensor is connected directly to a second pin of a motor chip of the vibration motor; and the first processing unit configured to notify directly the vibration motor to generate vibration through the pressure sensor is implemented by: pulling down or up, by the pressure-sensitive chip, a level of the first pin; and enabling the vibration motor to generate vibration in a case that the motor chip receives the level pulled down or up through the second pin connected directly to the first pin.

In some embodiments, a third pin of a pressure-sensitive chip of the pressure sensor is connected directly to a fourth pin of the application processor, and the vibration motor includes a motor chip; and the second processing unit configured to notify the application processor to control the vibration motor to generate vibration through the pressure sensor is implemented by: pulling down or up, by the pressure-sensitive chip, a level of the third pin, and uploading a vibration signal to a framework layer in a case that the application processor receives the level pulled down or up through the fourth pin connected directly to the third pin; sending a vibration instruction to the motor chip after receiving the vibration signal by the framework layer; and enabling the vibration motor to generate corresponding vibration based on the vibration instruction after receiving the vibration instruction by the motor chip.

In some embodiments, the pressure-sensitive vibration processing apparatus further includes: a determining unit configured to determine whether a current state of the mobile terminal is the first state or the second state by the application processor; when the mobile terminal is in the first state, the first processing unit sends first notification to the pressure sensor to enable the pressure sensor to notify directly the vibration motor to generate vibration when the pressure received by the pressure sensor exceeds the threshold; and when the mobile terminal is in the second state, the second processing unit sends second notification to the pressure sensor to enable the pressure sensor to notify the application processor to control the vibration motor to generate vibration when the pressure received by the pressure sensor exceeds the threshold.

In some embodiments, the first state includes one of the following states: the mobile terminal being in a screen off state, the mobile terminal being in a power saving mode, and the mobile terminal being in a sleep mode; and the second state includes one of the following states: the mobile terminal being in a screen on state, and the mobile terminal receiving a voice and/or key command.

According to a third aspect of embodiments of the present disclosure, there is provided a mobile terminal including an application processor, a pressure sensor for monitoring pressure, and a vibration motor for generating vibration, and the mobile terminal performs the pressure-sensitive vibration processing method according to, for example, the first aspect when user's touch pressure is received.

According to a fourth aspect of embodiments of the present disclosure, there is provided an electronic device including memory storing instructions and a processor configured to invoke instructions stored in the memory to execute the pressure-sensitive vibration processing method according to the first aspect.

According to a fifth aspect of the embodiments of the present disclosure, there is provided a computer-readable storage medium that stores instructions, and when the instructions are executed by a processor, the pressure-sensitive vibration processing method of the first aspect is executed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In some technologies, in the case of system hibernation, it may be necessary to wake up the application processor first, and then the application processor (AP) can handle vibration events of the motor, which brings a delay of about tens of milliseconds, and thus it seriously affects the user experience.

In other technologies, it is possible to respond to generate vibration without the application processor by directly connecting a pin of the pressure-sensitive chip to a pin of the motor chip. However, when handling complex vibration scenarios, such as a scenario in which not only pressure-sensitive buttons but also other vibration feedback requirements (such as touch screen pressing, etc.) exist, and the vibration feedback effects of the two vibrations are inconsistent, since the final vibration source is the motor chip, which cannot meet the two vibration requirements at the same time, if it is not handled, the vibration feedback may be abnormal.

In order to overcome the problems described above, the embodiments of the present disclosure provide a pressure-sensitive vibration processing method 10, which can be used in mobile terminals such as mobile phones and tablet computers, and the mobile terminal includes an application processor, a pressure sensor for monitoring pressure, and a vibration motor for generating vibration. Herein, the pressure sensor can monitor the press from the user at the pressure-sensitive buttons, can also monitor the touch screen press, etc., and further generates vibration through the vibration motor based on the pressure.

Figure 1:
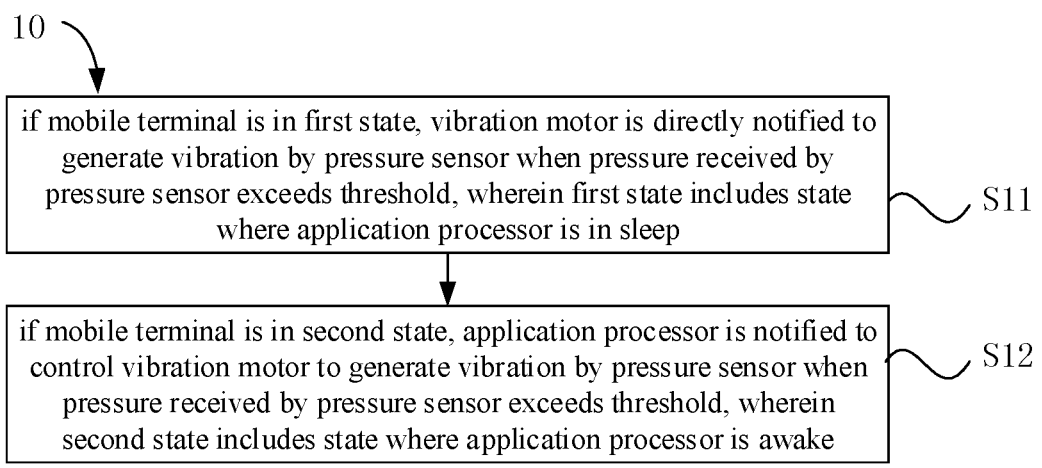
FIG. 1 is a schematic flow chart illustrating a pressure-sensitive vibration processing method according to some embodiments.

As shown in FIG. 1, the pressure-sensitive vibration processing method 10 includes steps S11-S12:

In step S11, if the mobile terminal is in a first state, the vibration motor is directly notified to generate vibration by the pressure sensor when the pressure received by the pressure sensor exceeds a threshold, wherein the first state includes a state where the application processor is in sleep.

The first state of the present disclosure can include: the mobile terminal being in a screen off state, the mobile terminal being in a power saving mode, the mobile terminal being in a sleep mode, and the like. In the first state, the application processor may enter a sleep state to save power consumption of the system. At this time, in a case where the pressure received by the pressure sensor exceeds the threshold, if the application processor is woken up to respond to the vibration, the wake-up process may cause a great delay, therefore, in the embodiments of the present disclosure, the pressure sensor directly notifies the vibration motor to enable the vibration motor to generate vibration, and thus there is no need to wake up the application processor. Also, in the first state, no complex vibration feedback requirements are generated generally, and no system errors occur.

In some embodiments, a first pin of the pressure-sensitive chip of the pressure sensor is directly connected to a second pin of the motor chip of the vibration motor; and the vibration motor being directly notified by the pressure sensor to generate vibration is implemented by: the level of the first pin being pulled down or up by the pressure-sensitive chip; and the motor chip receiving the level pulled down or up through the second pin directly connected to the first pin, to enable the vibration motor to generate vibration.

In the mobile terminal of the present disclosure, the first pin of the pressure-sensitive chip is directly connected to a second pin of the motor chip, and through this arrangement, when the pressure received by the pressure sensor exceeds the threshold, the level of the first pin is pulled down or up by the pressure-sensitive chip, to directly notify the motor chip thereby enabling the vibration motor to generate vibration. Notification in this way can eliminate the need to wake up the application processor, reducing response time.

In Step S12, if the mobile terminal is in a second state, the application processor is notified to control the vibration motor to generate vibration by the pressure sensor when pressure received by the pressure sensor exceeds the threshold, wherein the second state includes a state where the application processor is awake.

The second state of the present disclosure can include: the mobile terminal being in a screen on state and the mobile terminal receiving a voice and/or key command. In the second state, in a case where the application processor is in an awake state, when the pressure received by the pressure sensor exceeds the threshold, the application processor can be notified, and the application processor further enables the vibration motor to generate vibration. Since the application processor has been already in the awake state, the time to wake up the application processor is saved, and the response time can be ensured, and at the same time, in the second state, users often have multiple interactions with mobile terminals and may require multiple vibration responses, and thus the processor sensor notifies the application processor to perform processing separately after receiving different touch and press, which can ensure that corresponding responses are made for different categories.

In some embodiments, a third pin of the pressure-sensitive chip of the pressure sensor is directly connected to a fourth pin of the application processor, and the vibration motor includes the motor chip; and the application processor being notified to control the vibration motor to generate vibration by the pressure sensor is implemented by: pulling down or up a level of the third pin by the pressure-sensitive chip, and receiving, by the application processor, a level pulled down or up through the fourth pin directly connected to the third pin, such that a vibration signal is uploaded to a framework; the framework sends a vibration instruction to the motor chip after receiving the vibration signal; and the motor chip enables the vibration motor to generate corresponding vibration based on the vibration instruction after receiving the vibration instruction.

In the mobile terminal of the present disclosure, the third pin of the pressure-sensitive chip can be directly connected to a fourth pin of the application processor, and the notification can be made by pulling up or down the level of the first pin by the pressure-sensitive chip. The application processor notifies the framework layer after receiving the notification signal, and the framework layer controls the vibration motor to generate corresponding vibration after receiving the vibration signal.

Figure 2:
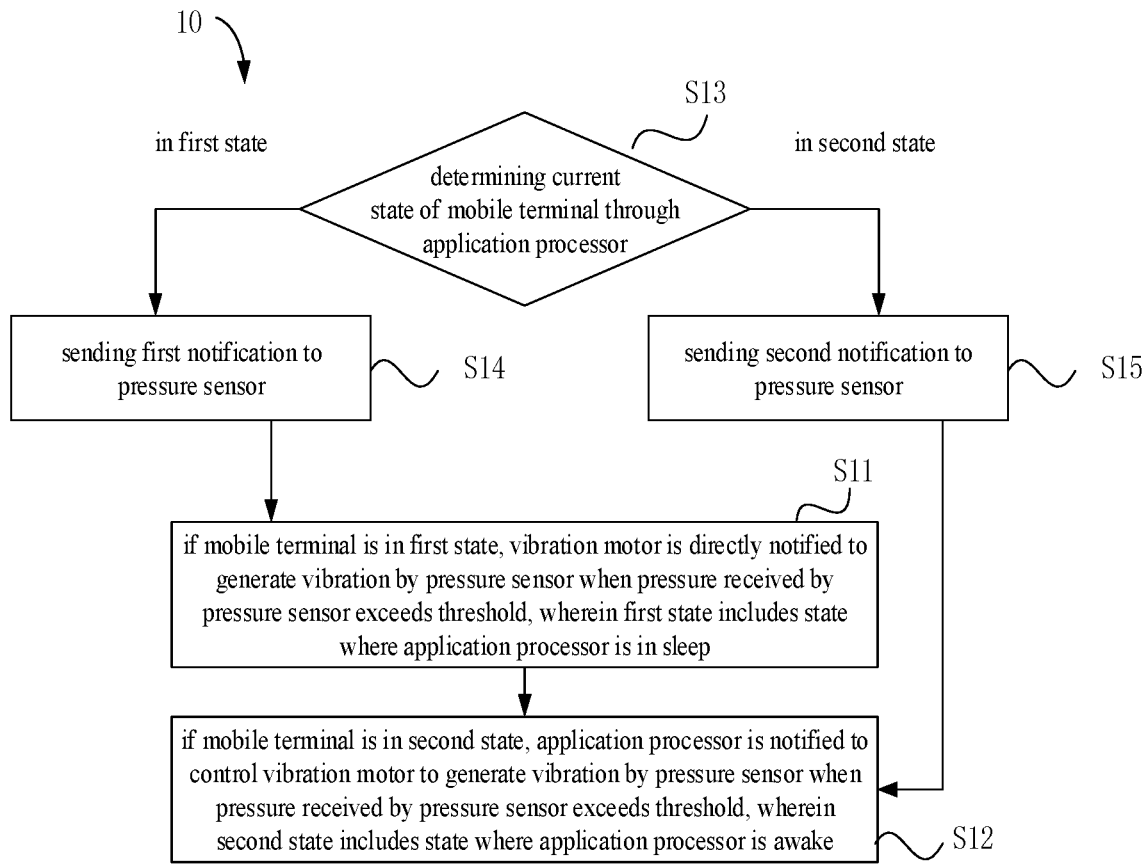
FIG. 2 is a schematic flow chart illustrating another pressure-sensitive vibration processing method according to some embodiments.

In some embodiments, as shown in FIG. 2, the pressure-sensitive vibration processing method 10 can further include: Step S13, determining whether a current state of the mobile terminal is the first state or the second state through the application processor; Step S14, sending first notification to the pressure sensor when the mobile terminal is in the first state, such that the vibration motor is directly notified to generate vibration by the pressure sensor when the pressure received by the pressure sensor exceeds the threshold; and Step S15, sending second notification to the pressure sensor when the mobile terminal is in the second state, such that the application processor is notified, by the pressure sensor, to control the vibration motor to generate vibration when the pressure received by the pressure sensor exceeds the threshold.

In this embodiment, the application processor can determine the state of the mobile terminal in real time, and the pressure sensor is notified when the mobile terminal enters the first state, such that the pressure sensor responds to the vibration requirements by directly notifying the vibration motor when the received pressure exceeds the threshold, and in some embodiments, the notification is made though the directly connected pins. However, when the mobile terminal enters the second state, the application processor notifies the pressure sensor, and when the received pressure exceeds the threshold, the vibration motor is not directly notified, but the application processor is notified, and then the application processor further controls the vibration motor to generate vibration. In this way, a timely response to vibration requirements is ensured, and a response capacity in scenarios where the complex vibration requirements may occur is ensured.

Figure 3:
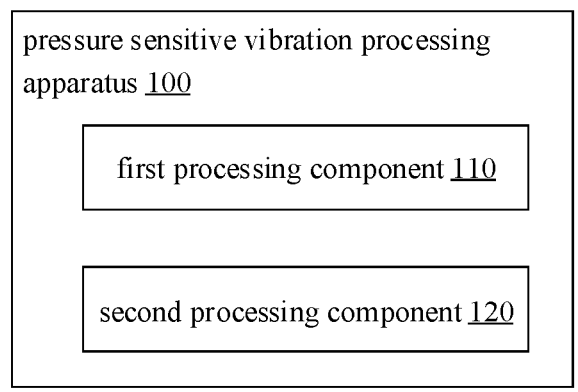
FIG. 3 is a schematic block diagram illustrating a pressure-sensitive vibration processing apparatus according to some embodiments.

FIG. 3 shows a pressure-sensitive vibration processing apparatus 100 applied to a mobile terminal, and the mobile terminal includes an application processor, a pressure sensor for monitoring pressure, and a vibration motor for generating vibration; and the pressure-sensitive vibration processing apparatus 100 includes: a first processing unit 110 configured to directly notify the vibration motor to generate vibration through the pressure sensor when the mobile terminal is in a first state and the pressure received by the pressure sensor exceeds a threshold, wherein the first state includes a state where the application processor is in sleep; and a second processing unit 120 configured to notify the application processor to control the vibration motor to generate vibration through the pressure sensor when the mobile terminal is in a second state and the pressure received by the pressure sensor exceeds the threshold, wherein the second state includes a state where the application processor is awake.

In some embodiments, a first pin of the pressure-sensitive chip of the pressure sensor is directly connected to a second pin of the motor chip of the vibration motor; and the first processing unit 110 directly notifying the vibration motor to generate vibration through the pressure sensor is implemented by: pulling down or up a level of the first pin by the pressure-sensitive chip; and receiving a level pulled down or up through the second pin directly connected to the first pin by the motor chip, to enable the vibration motor to generate vibration.

In some embodiments, a third pin of the pressure-sensitive chip of the pressure sensor is directly connected to a fourth pin of the application processor, and the vibration motor includes a motor chip; and the second processing unit 120 notifying the application processor to control the vibration motor to generate vibration by the pressure sensor is implemented by: pulling down or up a level of the third pin by the pressure-sensitive chip, and receiving a level pulled down or up through the fourth pin directly connected to the third pin by the application processor, such that a vibration signal is uploaded to a framework; the framework sends a vibration instruction to the motor chip after receiving the vibration signal; and the motor chip enables the vibration motor to generate corresponding vibration based on the vibration instruction after receiving the vibration instruction.

Figure 4:
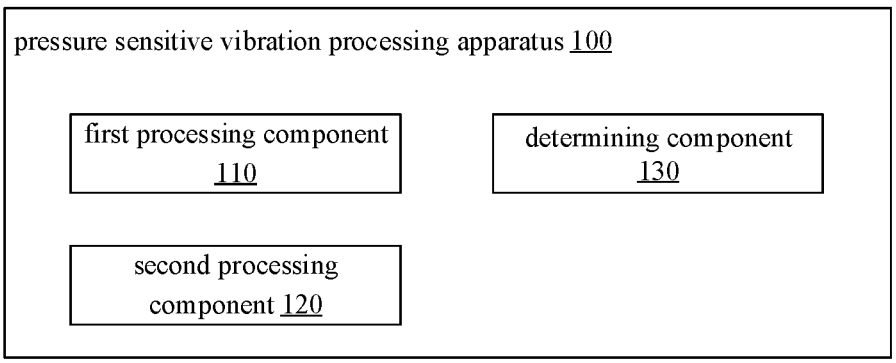
FIG. 4 is a schematic block diagram illustrating another pressure-sensitive vibration processing apparatus according to some embodiments.

In some embodiments, as shown in FIG. 4, the pressure-sensitive vibration processing apparatus 100 further includes: a determining unit 130 configured to determine whether a current state of the mobile terminal is the first state or the second state through the application processor; sending first notification to the pressure sensor through the first processing unit 110, when the mobile terminal is in the first state, such that the vibration motor is directly notified to generate vibration by the pressure sensor, when the pressure received by the pressure sensor exceeds the threshold; and sending second notification to the pressure sensor through the second processing unit 120, when the mobile terminal is in the second state, such that the application processor is notified to control the vibration motor to generate vibration by the pressure sensor, when the pressure received by the pressure sensor exceeds the threshold.

In some embodiments, the first state includes one of the following states: the mobile terminal being in a screen off state, the mobile terminal being in a power saving mode, and the mobile terminal being in a sleep mode; and the second state includes one of the following states: the mobile terminal being in a screen on state, and the mobile terminal receiving a voice and/or key command.

With respect to the pressure-sensitive vibration processing apparatus 100 in the above embodiments, the implementations for performing operations by individual modules therein have been described in detail in the embodiments regarding the methods, which will not be elaborated herein.

In some embodiments, the present disclosure further provides a mobile terminal including an application processor, a pressure sensor for monitoring pressure and a vibration motor for generating vibration; and the mobile terminal performs processing by the pressure-sensitive vibration processing method 10 of any one of the foregoing embodiments when receiving user's touch pressure.

With respect to the mobile terminal in the above embodiments, the implementations for performing operations by individual modules therein have been described in detail in the embodiments regarding the methods, which will not be elaborated herein.

Figure 5:
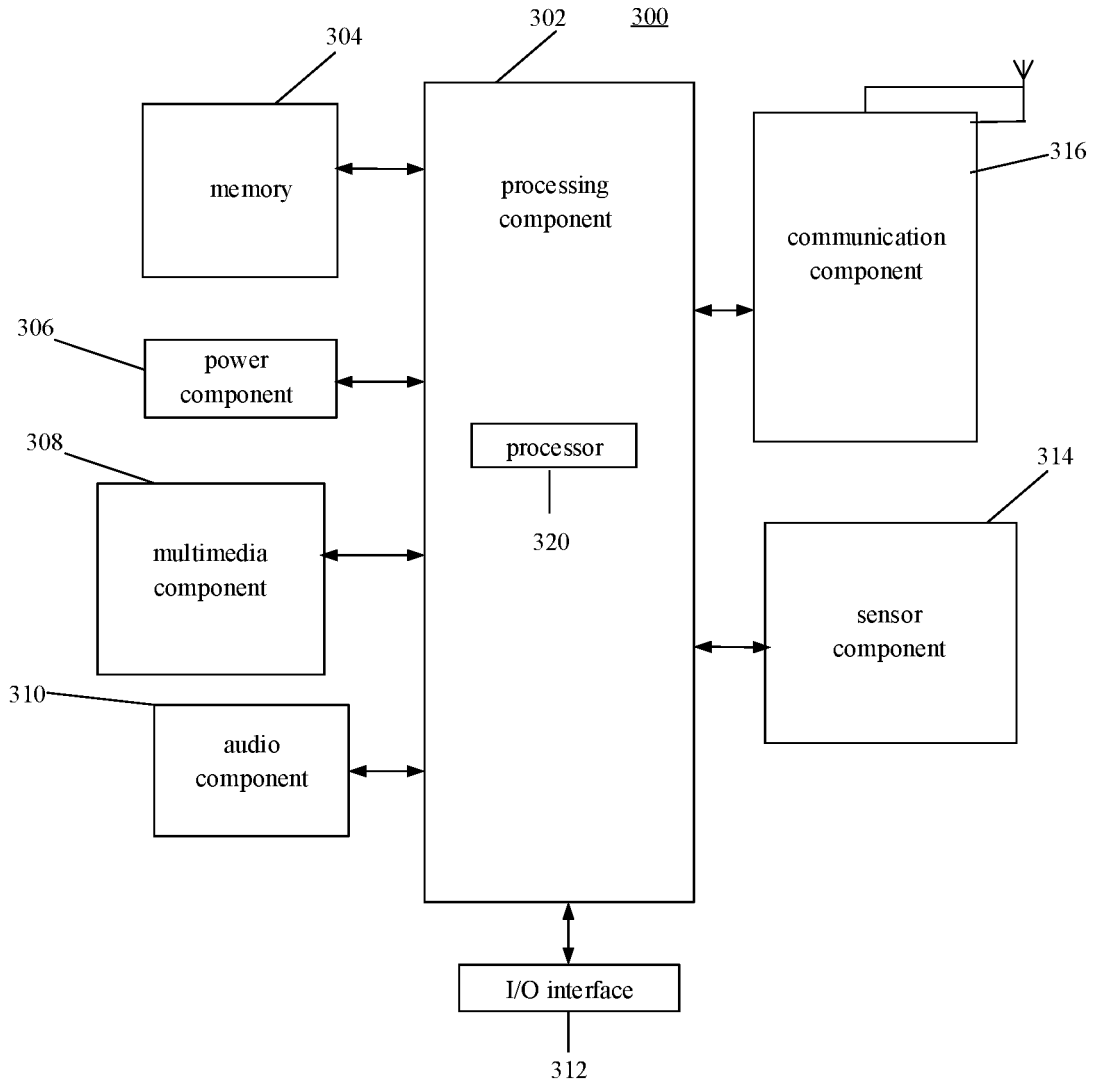
FIG. 5 is a schematic block diagram illustrating a device according to some embodiments.

FIG. 5 is a schematic block diagram illustrating a device of any one of the foregoing embodiments according to some embodiments. For example, the device 300 may be a mobile phone, a computer, a digital broadcast terminal, a messaging device, a gaming console, a tablet, a medical device, fitness equipment, a personal digital assistant, and the like.

Referring to FIG. 5, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to implement all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 supplies power to various components of the device 300. The power component 306 may include a power management system, one or more power sources, and any other components associated with the generation, management, and distribution of power in the device 300.

The multimedia component 308 includes a screen providing an output interface between the device 300 and a user. In some embodiments, the screen may include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also detect a period of time and a pressure associated with the touch or swipe action. In some embodiments, the multimedia component 308 includes a front camera and/or a rear camera. The front camera and/or the rear camera can receive external multimedia data while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal can be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 can detect an on/off status of the device 300, relative positioning of components, e.g., the display and a keypad, of the device 300, the sensor component 314 can also detect a change in position of the device 300 or one component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 can also include an accelerometer sensor, a gyroscope sensor, a magnetic sensor, a pressure sensor, or a temperature sensor.

The communication component 316 is configured to facilitate wired or wireless communication between the device 300 and other devices. The device 300 can access a wireless network based on a communication standard, such as Wi-Fi, 2G, 3G, 4G, or 5G, or a combination thereof. In some embodiments, the communication component 316 receives a broadcast signal or broadcast associated information from an external broadcast management system via a broadcast channel. In some embodiments, the communication component 316 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a computer-readable storage medium including instructions, such as the memory 304 including the instructions executable by the processor 320 in the device 300, for performing the above-described methods. For example, the computer-readable storage medium can be a ROM, a random access memory (RAM), a CD-ROM, a magnetic tape, a floppy disc, an optical data storage device, and the like.

Figure 6:
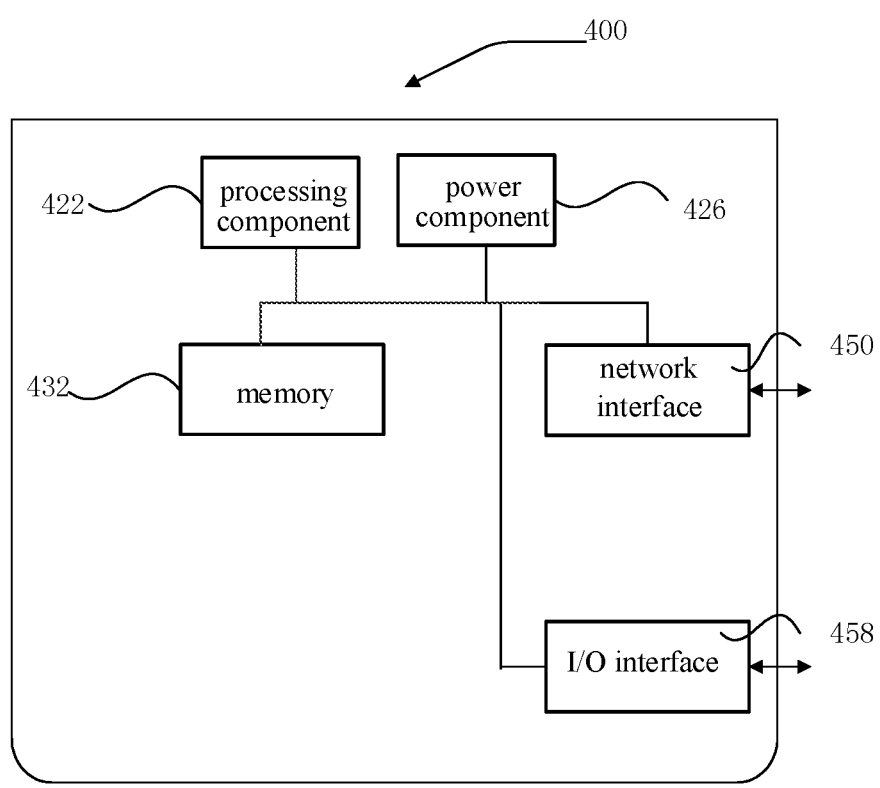
FIG. 6 is a schematic block diagram illustrating an electronic device according to some embodiments.
Figure 7:
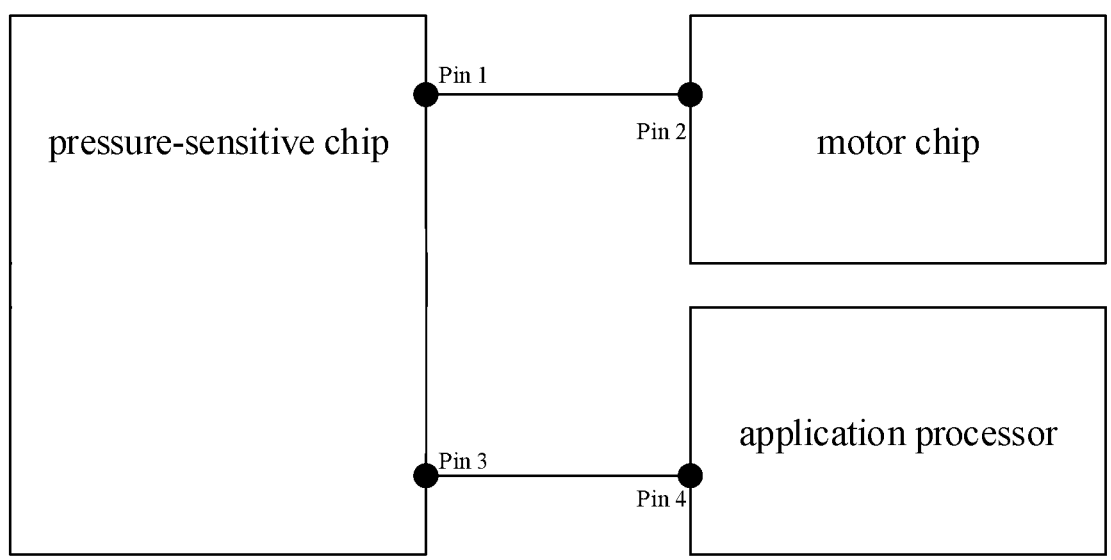
FIG. 7 is a schematic block diagram illustrating components of an electronic device according to some embodiments, including a pressure-sensitive chip having a first pin (pin 1), a third pin (pin 3), a motor chip having a second pin (pin 2), and an application processor having a fourth pin (pin 4).

FIG. 6 is a block diagram illustrating an electronic device 400 according to some embodiments. For example, the electronic device 400 may be provided as a server. Referring to FIG. 6, the electronic device 400 includes a processing component 422, which further includes one or more processors, and memory resources represented by a memory 432, for storing instructions executable by the processing component 422, such as application programs. The application program stored in the memory 432 may include one or more modules each corresponding to a set of instructions. In addition, the processing component 422 is configured to execute instructions to perform the above method.

The electronic device 400 can also include a power component 426 configured to perform power management of the device 300, a wired or wireless network interface 450 configured to connect the electronic device 400 to the network, and an input/output (I/O) interface 458. The electronic device 400 can perform an operation based on an operating system stored in the memory 432, such as Windows Server™, Mac OS X™, Unix™, Linux™, FreeBSD™, or the like.

Various embodiments of the present disclosure can include one or more of the following advantages: by adopting different methods to handle the pressure-sensitive vibration in different modes, timely responses can be ensured when the generation of vibration is required, and it can also be ensured that various vibrations are handled normally during system operation to avoid abnormal vibration feedback.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A pressure-sensitive vibration processing method, applied to a mobile terminal comprising an application processor, a pressure sensor configured to monitor pressure, and a vibration motor configured to generate vibration, the pressure-sensitive vibration processing method comprising:
   in a case that the mobile terminal is in a first state, notifying directly, with the pressure sensor, the vibration motor to generate vibration, when pressure received by the pressure sensor exceeds a threshold, wherein the first state comprises a state where the application processor is in a sleep mode; and
   in a case that the mobile terminal is in a second state, notifying, with the pressure sensor, the application processor to control the vibration motor to generate vibration, when pressure received by the pressure sensor exceeds the threshold, wherein the second state comprises a state where the application processor is in an awake mode,
   wherein
   a first pin of a pressure-sensitive chip of the pressure sensor is connected directly to a second pin of a motor chip of the vibration motor; and
   the notifying directly, by the pressure sensor, the vibration motor to generate vibration is implemented by:
   pulling down or up, by the pressure-sensitive chip, a level of the first pin; and
   enabling the vibration motor to generate vibration in a case that the motor chip receives the level pulled down or up through the second pin connected directly to the first pin.

2. The pressure-sensitive vibration processing method according to claim 1, wherein a third pin of a pressure-sensitive chip of the pressure sensor is connected directly to a fourth pin of the application processor, and the vibration motor comprises a motor chip; and
   the notifying, by the pressure sensor, the application processor to control the vibration motor to generate vibration by the pressure sensor is implemented by:
   pulling down or up, by the pressure-sensitive chip, a level of the third pin, and uploading a vibration signal to a framework layer in a case that the application processor receives the level pulled down or up through the fourth pin connected directly to the third pin;
   sending a vibration instruction to the motor chip after receiving the vibration signal by the framework layer; and
   enabling the vibration motor to generate corresponding vibration based on the vibration instruction after receiving the vibration instruction by the motor chip.

3. The pressure-sensitive vibration processing method according to claim 1, further comprising:
   determining whether a current state of the mobile terminal is the first state or the second state through the application processor:
   sending first notification to the pressure sensor when the mobile terminal is in the first state, to enable the pressure sensor to notify directly the vibration motor to generate vibration when the pressure received by the pressure sensor exceeds the threshold; and
   sending second notification to the pressure sensor when the mobile terminal is in the second state, to enable the pressure sensor to notify the application processor to control the vibration motor to generate vibration when the pressure received by the pressure sensor exceeds the threshold.

4. The pressure-sensitive vibration processing method according to claim 3, wherein
the first state comprises one of the following states: the mobile terminal being in a screen off state, the mobile terminal being in a power saving mode, and the mobile terminal being in a sleep mode; and
the second state comprises at least one of: the mobile terminal being in a screen on state, and the mobile terminal receiving a voice and/or key command.

5. A mobile terminal implementing the method of claim 1, comprising the application processor, the pressure sensor configured to monitor the pressure, and the vibration motor configured to generate the vibration, and perform steps of the pressure-sensitive vibration processing method upon receiving the pressure from user's touch.

6. The mobile terminal according to claim 5, wherein a third pin of a pressure-sensitive chip of the pressure sensor is connected directly to a fourth pin of the application processor, and the vibration motor comprises a motor chip; and
the notifying, with the pressure sensor, the application processor to control the vibration motor to generate vibration by the pressure sensor is implemented by:
pulling down or up, with the pressure-sensitive chip, a level of the third pin, and uploading a vibration signal to a framework layer in a case that the application processor receives the level pulled down or up through the fourth pin connected directly to the third pin;
sending a vibration instruction to the motor chip after receiving the vibration signal by the framework layer; and
enabling the vibration motor to generate corresponding vibration based on the vibration instruction after receiving the vibration instruction by the motor chip.

7. The mobile terminal according to claim 5, wherein the steps of the pressure-sensitive vibration processing method further comprise:
determining whether a current state of the mobile terminal is the first state or the second state through the application processor:
sending first notification to the pressure sensor when the mobile terminal is in the first state, to enable the pressure sensor to notify directly the vibration motor to generate vibration when the pressure received by the pressure sensor exceeds the threshold; and
sending second notification to the pressure sensor when the mobile terminal is in the second state, to enable the pressure sensor to notify the application processor to control the vibration motor to generate vibration when the pressure received by the pressure sensor exceeds the threshold.

8. The mobile terminal according to claim 7, wherein
the first state comprises at least one of: the mobile terminal being in a screen off state, the mobile terminal being in a power saving mode, and the mobile terminal being in a sleep mode; and
the second state comprises at least one of: the mobile terminal being in a screen on state, and the mobile terminal receiving a voice and/or key command.

9. The mobile terminal according to claim 8, wherein the mobile terminal is configured with a plurality of different modes including the first mode and the second mode, and is configured to implement a plurality of different methods to handle the pressure-sensitive vibration in the plurality of different modes, to thereby ensure timely responses upon need for the vibration, and to ensure that different vibrations are handled normally during system operation to avoid abnormal vibration feedback.

10. The mobile terminal according to claim 9, further comprising a touch screen integrated with the pressure sensor, wherein
in the sleep mode of the mobile terminal, the pressure sensor is configured to directly notify the vibration motor without first waking up the application processor, to generate a first vibration feedback; and
in the second state, the pressure sensor is configured to notify the application processor to control the vibration motor to generate a plurality of different second vibration feedbacks corresponding to different commands including the voice and/or key command;
wherein the first vibration feedback and the plurality of different second vibration feedbacks are different.

11. An electronic device implementing the method of claim 1, comprising:
memory storing instructions; and
a processor configured to invoke instructions stored in the memory to execute operations of the pressure-sensitive vibration processing method.

12. A non-transitory computer-readable storage medium having stored thereon instructions executed by a processor to implement operations of the pressure-sensitive vibration processing method according to claim 1.

13. The non-transitory computer-readable storage medium according to claim 12, wherein operations of the pressure-sensitive vibration processing method further comprise:
determining whether a current state of the mobile terminal is the first state or the second state through the application processor:
sending first notification to the pressure sensor when the mobile terminal is in the first state, to enable the pressure sensor to notify directly the vibration motor to generate vibration when the pressure received by the pressure sensor exceeds the threshold; and
sending second notification to the pressure sensor when the mobile terminal is in the second state, to enable the pressure sensor to notify the application processor to control the vibration motor to generate vibration when the pressure received by the pressure sensor exceeds the threshold.

14. A pressure-sensitive vibration processing apparatus applied to a mobile terminal comprising an application processor, a pressure sensor for monitoring pressure, and a vibration motor for generating vibration, the pressure-sensitive vibration processing apparatus comprising:
a first processing component configured to notify directly the vibration motor to generate vibration through the pressure sensor when the mobile terminal is in a first state and pressure received by the pressure sensor exceeds a threshold, wherein the first state comprises a state where the application processor is in sleep; and
a second processing component configured to notify the application processor to control the vibration motor to generate vibration through the pressure sensor when the mobile terminal is in a second state and pressure received by the pressure sensor exceeds the threshold, wherein the second state comprises a state where the application processor is awake,
wherein a first pin of a pressure-sensitive chip of the pressure sensor is connected directly to a second pin of a motor chip of the vibration motor; and the first processing component configured to notify directly the vibration motor to generate vibration through the pressure sensor is implemented by:

pulling down or up, by the pressure-sensitive chip, a level of the first pin; and enabling the vibration motor to generate vibration in a case that the motor chip receives the level pulling down or up through the second pin connected directly to the first pin.

15. The pressure-sensitive vibration processing apparatus according to claim 14, wherein a third pin of a pressure-sensitive chip of the pressure sensor is connected directly to a fourth pin of the application processor, and the vibration motor comprises a motor chip; and the second processing component configured to notify the application processor to control the vibration motor to generate vibration through the pressure sensor is implemented by:

pulling down or up, by the pressure-sensitive chip, a level of the third pin, and uploading a vibration signal to a framework layer in a case that the application processor receives the level pulled down or up through the fourth pin connected directly to the third pin;

sending a vibration instruction to the motor chip after receiving the vibration signal by the framework layer; and enabling the vibration motor to generate corresponding vibration based on the vibration instruction after receiving the vibration instruction by the motor chip.

16. The pressure-sensitive vibration processing apparatus according to claim 14, further comprising:

a determining component configured to determine whether a current state of the mobile terminal is the first state or the second state by the application processor;

in a case that the mobile terminal is in the first state, the first processing component sending first notification to the pressure sensor to enable the pressure sensor to notify directly the vibration motor to generate vibration when the pressure received by the pressure sensor exceeds the threshold; and in a case that the mobile terminal is in the second state, the second processing component sending second notification to the pressure sensor to enable the pressure sensor to notify the application processor to control the vibration motor to generate vibration when the pressure received by the pressure sensor exceeds the threshold.

17. The pressure-sensitive vibration processing apparatus according to claim 16, wherein the first state comprises at least one of: the mobile terminal being in a screen off state, that the mobile terminal being in a power saving mode, and the mobile terminal being in a sleep mode; and the second state comprises at least one of: the mobile terminal being in a screen on state, and the mobile terminal receiving a voice and/or key command.

* * * * *